United States Patent
Berenz et al.

(10) Patent No.: US 6,420,704 B1
(45) Date of Patent: Jul. 16, 2002

(54) METHOD AND SYSTEM FOR IMPROVING CAMERA INFRARED SENSITIVITY USING DIGITAL ZOOM

(75) Inventors: John J. Berenz, San Pedro; George W. McIver, Redondo Beach; Barry Dunbridge, Torrance, all of CA (US)

(73) Assignee: TRW Inc., Redondo Beach, CA (US)

( * ) Notice: Subject to any disclaimer, the term of this patent is extended or adjusted under 35 U.S.C. 154(b) by 5 days.

(21) Appl. No.: 09/732,429

(22) Filed: Dec. 7, 2000

(51) Int. Cl.$^7$ .................................................. G01J 3/02
(52) U.S. Cl. ...................... 250/330; 250/332; 250/334; 250/338.1; 250/201.2; 250/221
(58) Field of Search ................................. 250/330, 332, 250/334, 338.1, 201.2, 221

(56) References Cited

U.S. PATENT DOCUMENTS

| | | | |
|---|---|---|---|
| 5,065,024 A | * 11/1991 | McCullough | 250/330 |
| 5,274,223 A | * 12/1993 | Hata | 250/201.2 |
| 5,398,095 A | * 3/1995 | Tsukamoto et al. | 354/400 |
| 5,710,428 A | * 1/1998 | Ko | 250/332 |

OTHER PUBLICATIONS

Jackson, "Give Me the Night (Vision)—Techy military tool takes to the streets in 2000", Auto World Magazine, Oct. 1998.

"Vision–based Vehicle Guidance", Ichiro Masaki (Editor), Chapter 12, pp. 238–239, 1992.

M. Mao, et al., "Direct–View Uncooled Micro–Optomechanical Infrared Camera," IEEE MEM'99 Conference, Jan. 11–21, 1999, Orlando, Florida.

"U3000 Uncooled Microbolometer Infrared Sensor", Marketing Brochure, Boeing Electronics/Information Systems, Website, 1996–1998.

"Yttrium–Based Material Forms Uncooled IR Detectors", IEEE Photonics Website, Jan. 26, 1998.

R. Amantea, et al., "An Uncooled IR Imager with 5 mK NEDT", SPIE vol. 3061, p. 210, 1997.

"Diode Laser Headlights Aid Night Vision", Automotive Engineering International, Jul. 1999, pp. 50, 52, 54.

"Sony Hi8 Camcorders", Marketing Brochure, Sony Corporation, Jun. 11, 1999.

"Minilynx–The Hand Held Gated Laser Viewer", Marketing Brochure, Laser Optronix Website, Oct. 27, 1999.

* cited by examiner

Primary Examiner—Constantine Hannaher
Assistant Examiner—Andrew Israel

(57) ABSTRACT

A system for providing recognition of an approaching object located in a distant no-light environment includes an illumination source for transmitting light to the distant object and an imaging device for detecting the light radiation reflected from the distant object to generate an image of the distant object corresponding thereto. The system also includes an independent digital signal processor for calculating a desired optical magnification of a lens of the imaging device as a function of a distance between the imaging device and the distant object and generates a voltage corresponding thereto. The digital signal processor applies the voltage to the digital zoom circuitry of the imaging device to adjust the magnification of the lens so that the image of the distant object is held in a fixed dimension.

20 Claims, 2 Drawing Sheets

METHOD AND SYSTEM FOR IMPROVING CAMERA INFRARED SENSITIVITY USING DIGITAL ZOOM

BACKGROUND OF THE INVENTION

1. Field of the Invention

The present invention relates generally to a system and method for providing recognition of an approaching object located in a distant no-light environment and, more specifically, to a low-cost near-infrared (IR) imaging system that, by capturing sufficient infrared light photons from the distant object, is capable of increased infrared imaging sensitivity and range.

2. Description of the Prior Art

Visible and infrared imaging systems are known in the art for their usefulness in mitigating the effects of impaired night vision. Impaired night vision is a problematic and potentially dangerous situation caused by a reduced range of vision under conditions of darkness and is all too familiar an experience for automobile drivers, particularly drivers over the age of 40. For example, during the cover of darkness 20/20 vision is typically reduced to approximately 20/50 where a reduction in vision of this magnitude can result in the late perception of poorly illuminated obstacles located at a distance from a driver.

A number of military and commercial approaches that mitigate the effects of impaired night vision have been developed in the art using different light sources, ranging from ultraviolet to infrared, in conjunction with imaging cameras sensitive to light in the range of visible to far infrared. One such approach employs the use of low level visible light intensifiers within night vision scope devices and is based on technologies originally developed for military applications. Commercial versions of such night vision scope devices, like the Night Vision Pocketscope™ manufactured by ITT Defense & Electronics, amplify visible light using a microchannel plate as an electron multiplier and a photocathode as a detector. The night vision scope devices are relatively inexpensive and can provide significant enhancement in range on a clear night and, if used in conjunction with an illuminator, can also provide vision enhancement during overcast conditions. Unfortunately, however, night vision scopes of this type are not suitable for the large-scale manufacture required by the automotive industry and other industries that have high-volume production demands.

Another approach known in the art for solving the problem of impaired night vision is the use of thermal imaging. As described in the publication "Give Me the Night (Vision)," by K. Jackson, AutoWorld Magazine, October 1998, thermal imaging technology is certainly not new to the military and, in fact, has been used in some form or another for at least the past four decades. However, more and more, thermal imaging technology is being commercially exploited. For example, General Motor's 2000 Cadillac DeVille uses long wavelength infrared detectors that can operate in the one to twelve micron wavelength and, as a result, have the capability to detect thermal energy rather than light photons. In other words, instead of detecting an object by sensing the infrared illumination (light photons) that the object reflects, a warm object is thermally detected through its black body radiation. An advantage of such a system is its ability to detect—even when obstructed by foliage, etc.—objects having thermal emissions, such as humans, deer and automobile engines. However, a system of this type is disadvantaged because of its inability to detect fallen trees or other objects that do not emit thermally. A further disadvantage of such a system is its significant expensive. Thermal imaging systems typically require very expensive uncooled infrared detectors, such as resistive bolometers, that detect the heat energy of objects invisible to the human eye. Thermal detection involves focusing the thermal (heat) energy onto the uncooled infrared detector with sensor optics designed to pass IR wavelengths. Known approaches to uncooled infrared detectors include, a vanadium oxide 2D uncooled infrared detector array manufactured by Boeing Corporation; a yttrium barium copper oxide (YBCO) bolometer that has been demonstrated by MSI Inc; and Raytheon Corporation's approach to the uncooled infrared detector, is a pyroelectric capacitor array that requires a thermoelectric cooler as well as a chopper wheel, an approach that has been employed in the 2000 model GM Cadillac DeVille. The lowest cost approach to uncooled infrared detectors, however, is a micro electro mechanical system (MEMS) cantilever beam array. The cantilever beam array is a low-mass bimetallic diving board structure similar to an accelerometer where the amount of beam flexure is a function of its temperature and the temperature depends on the amount of incident infrared.

Still another approach known in the art for combating the effects of impaired night vision is the use of near-infrared sensors with illumination. A night vision imaging system employing the use of near-infrared sensor with illumination generally consists of an illuminator that illuminates a distant scene and a near-IR camera that generates an image of the distant scene. One such system developed by Ford Jaguar Inc., uses a charge coupled device (CCD) camera and a near-infrared (NIR) spotlight. The Jaguar system works by integrating the NIR spotlight with conventional high-beam lamps. And by using a 680×500 pixel charge-coupled device (CCD) monochrome digital camera that is sensitive to infrared light not visible to the human eye, the Jaguar system is able to capture an image of an object located in a dark distant scene. The Jaguar approach and others like it are perhaps a more practical approach to night vision imaging, mostly due to the availability of low cost components. But, because of the high sensitivity of conventional CCD detectors to visible illumination, modern CCD and like cameras typically have short exposure times that range from approximately $\frac{1}{60}$ to $\frac{1}{4000}$ of a second and, as a result, the camera's range is limited. Thus, the camera's ability to enhance a driver's visibility of on-coming traffic or up-coming road conditions, if traveling at speeds of 60 mph or more is limited since it takes approximately 250 feet for an automobile traveling at 60 mph to come to a complete stop. Moreover, for infrared wavelengths above 700 nm, the sensitivity of CCD detectors is considerably reduced to only approximately 15% to 25% of its peak response. This reduction prevents the camera from recognizing objects at more than approximately 200 feet away during cloud cover, fog or after sunset.

A better approach to near-infrared sensors with illumination, currently being used in search and rescue applications and pursued by Daimler-Chrysler Inc., is to use a pulsed laser diode as an illuminator and to gate the CCD camera shutter synchronously with the laser pulses. This approach has several advantages, including an achievement of 4 times higher peak optical power. The gating makes it possible to see through particles to approximately four to five times the range of the human eye and other vision systems. And, since the laser is polarized, filters can be used to enhance visibility in rain, fog, snow, etc. However, while such gated viewing systems can readily satisfy desired performance requirements, they are also too expensive for the average consumer.

Finally, other approaches known in the art include millimeter microwave (MMW) imaging and LIDAR, however, both of these approaches are far more expensive to implement than those approaches previously mentioned.

Thus, a near-infrared (IR) imaging system that is capable of increased infrared imaging sensitivity and range under conditions of darkness while providing a low-cost approach that would allow the average consumer to take advantage of enhanced night vision viewing is highly desirable.

SUMMARY OF THE INVENTION

The preceding and other shortcomings of the prior art are addressed and overcome by the present invention that provides a system for providing recognition of an approaching object located in a distant no-light environment. The system includes an illumination source for transmitting light to the distant object and an imaging device for detecting the light radiation reflected from the distant object to generate an image of the distant object corresponding thereto. The system also includes an independent digital signal processor for calculating a desired optical magnification of a lens of the imaging device that the holds an image of the distant object in a fixed dimension for a period of time sufficient to capture enough light radiation to more clearly identify the approaching distant object. The digital signal processor dynamically calculates the desired optical magnification of the imaging device lens as a function of a distance between the imaging device and the distant object. The digital signal processor then generates a voltage corresponding to the desired optical magnification, and applies this voltage to the imaging device to adjust a focus of the lens to the desired optical magnification.

BRIEF DESCRIPTION OF THE DRAWINGS

Reference is now made to the following description and attached drawings, wherein.

DETAILED DESCRIPTION OF THE INVENTION

Figure 1A:
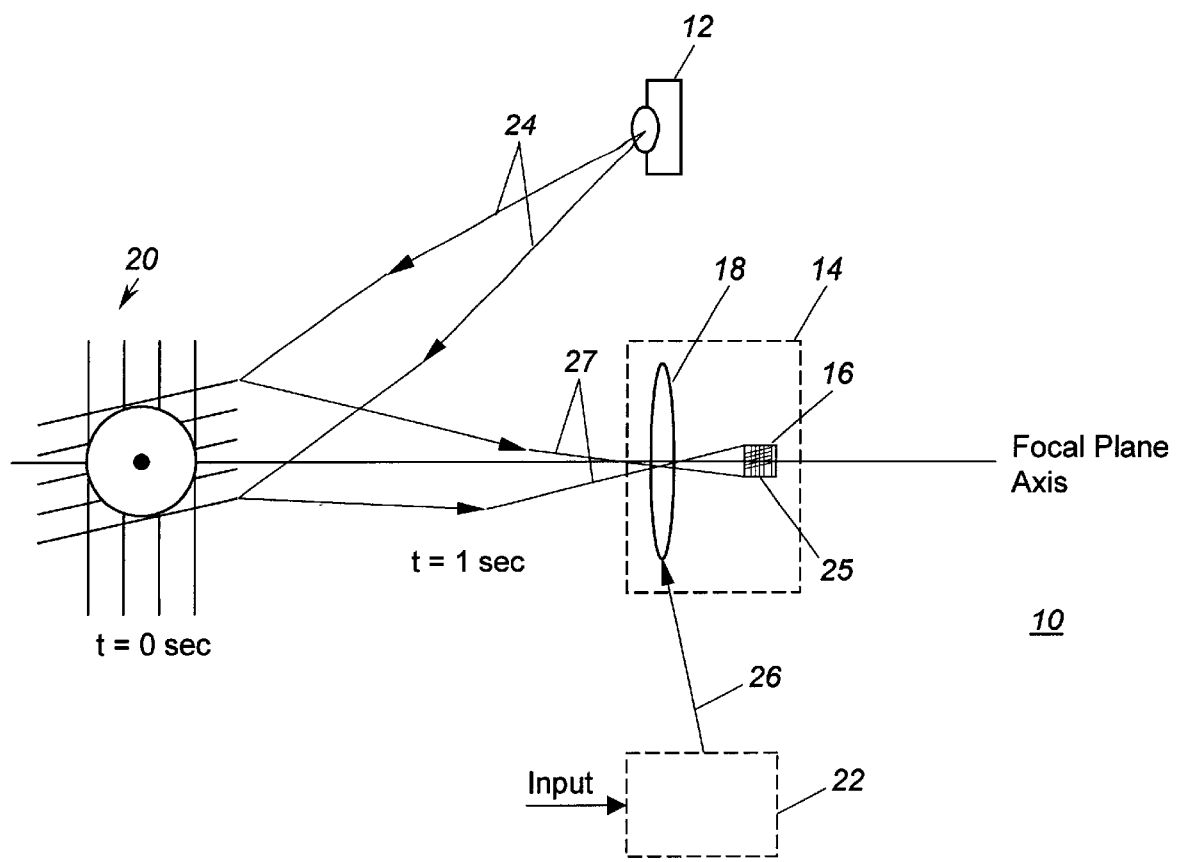
FIG. 1a is a functional diagram of an embodiment of a system in accordance with the present invention.

Referring to FIG. 1, is an embodiment of a near-infrared (IR) imaging system 10 in accordance with the present invention. As shown in FIG. 1a, the system 10 includes an IR sensitive imaging device 14, an illuminator 12 and a digital signal processor (DSP) 22. The IR sensitive imaging device 14 comprises a detector element 16 having several hundred pixel elements (not shown), and a lens 18 that is capable of digitally zooming focus in on or pulling focus back from a distant object 20 located in a distant no-light environment. To maintain a low-cost system 10, the IR sensitive imaging device 14 may be selected from one of the commercially available charge coupled device (CCD), complementary metal-oxide-semiconductor (CMOS) or like IR imaging cameras, such as the digital zoom capable Hi8 model CCD camera manufactured by SONY Corporation. However, this is not a necessary limitation of the invention and, therefore, the imaging device 14, herein further referenced as a camera, may be any device that is capable of detecting IR radiation and is also capable of electronic zoom.

Referring still to FIG. 1, the illuminator 12 is provided to illuminate the distant object 20 and is preferably, but not necessarily, an infrared light emitting diode. The illuminator 12 is modulated at high frequency to emit an illumination wavelength of approximately 800 nanometers (nm) which is near the peak response of most CCD and CMOS cameras, but invisible to the human eye. Light 24 originates from the illuminator 12, and is reflected from a surface of the object 20. The lens 18 of the camera 14, receives the reflected light 27 and focuses the light 27 onto a focal plane 25 of the detector element 16, here a CCD array chip, to generate an image (not shown) of the object 20. Because the camera 14 is sensitive to light in the spectral range of approximately 800 nm, which is key to enhancing night vision, the camera 14 is able to generate the image (not shown) of the object 20 during the cover of darkness.

The independent digital signal processor (DSP) 22 is provided to control the exposure of the camera 14 in such a way that allows the camera 14 to sufficiently integrate the distant object's photon energy 27 without distorting the image of the object 20. More particularly, in accordance with the preferred embodiment of the present invention, improvement in the sensitivity and range of the camera 14 is achieved by holding a shutter (not shown) of the lens 18 open for an extended period of time that is preferably, but not necessarily, up to approximately one second. By allowing the lens 18 to remain open for a longer period of time, the lens 18 is able to stare at the object 20 longer, which allows the lens 18 to integrate on the object 20 for a longer period of time. By allowing the lens to integrate on the object 20 for a longer period of time, the lens 18 is able to collect more of the light photons 27 reflected from the object 20 which, based on known optical principles, significantly enhances the signal-to-noise ratio of the camera 14.

Figure 1B:
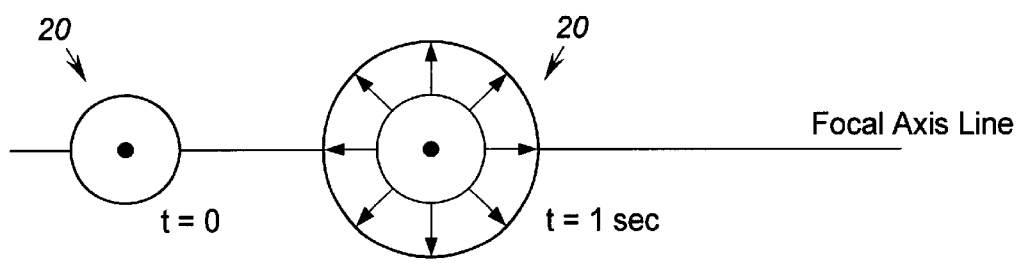
FIG. 1b is a functional diagram of a distorted focus of an imaged object as a function of relative velocity.
Figure 1C:
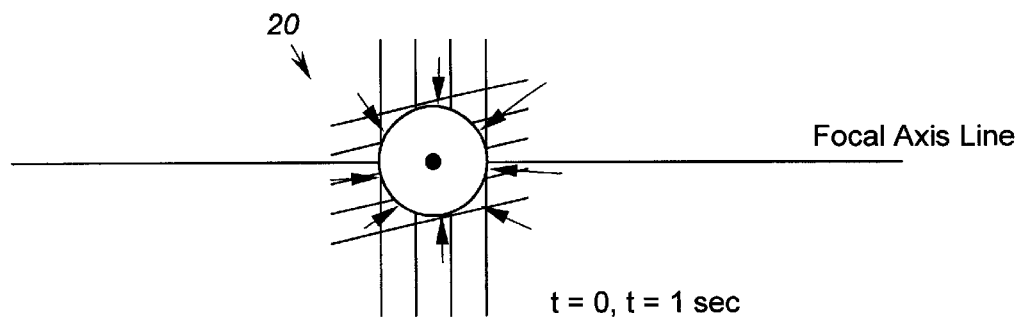
FIG. 1c is a functional diagram of a controlled focus of an imaged object as a function of relative velocity in accordance with the present invention.

Unfortunately, during this extended exposure period the camera 14 may be mounted to a vehicle that is moving a significant distance in the direction of the distant object 20. And this movement, as shown in FIG. 1b, causes the dimensions of the object 20 to grow increasingly large—a phenomenon known in the art as optical flow. To alleviate distortion of the object's image as a result of optical flow, the DSP chip 22 applies a digital zoom correction voltage 26 to the lens 18. As shown in FIG. 1c, the voltage 26 digitally adjusts the magnification of the lens 18 so that the dimensions of the object 20 remain constant throughout the entire exposure period. This magnification correction is applied uniformly to all pixels of the CCD detector 16 by the camera 14.

Figure 2:
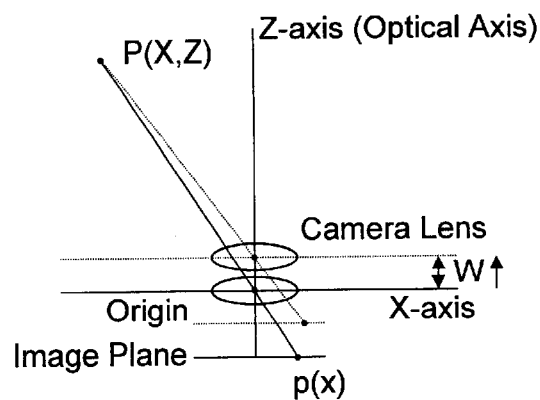
FIG. 2 is a graphical illustration of a known geometric equation that is used in the present invention to determine optical flow as a function of distance in accordance with the present invention.

Referring to FIG. 2, to generate the correction voltage 26, an arithmetic logic circuit (not shown) of the DSP chip 22 is programmed with an algorithm which, based on the speed of the vehicle, and a predetermined viewing range and exposure time of the camera system 14 uses a known geometric equation to determine an appropriate correction voltage 26 that corrects for the forward motion of the camera 14 during exposure. More particularly, for given optical focus, the geometric equation relates the distance between the camera lens 18 and a distant object to a magnification in size of the object on the focal plane 25 of the camera 14. Such an equation is, for example, discussed in detail in the publication, "Vision-based Vehicle Guidance," by Ichiro Masaki, the general concepts of which are included here for reference. The Masaki publication generally provides estimates of the distance between a camera and a target by the following optical flow equation:

$$u=(dX/dt)/Z-X(dZ/dt)/Z\times Z. \qquad (1)$$

where

P(X,Z)=coordinates of a target point P (0, W)=translational components of the motion of the camera dZ/dt=−W, a component of the camera motion x=X/Z, the coordinate of a point p on the image plane that is the perspective projection from the point P u=dx/dt, the optical flow at a point x.

Thus, if the camera 14 were moving in the direction of an object 20 at 65 miles per hour, as measured by a vehicle speedometer or a similar acceleration measuring device that is connected to the processor 22, and the shutter exposure time of the camera 14 were set to one second, the camera 14 would have traveled a distance of (65×5280)/3600=95.3 feet in one second. And according to equation (1), this distance corresponds to an increased magnification in the size of the object's image, meaning the object will appear 95.3 feet closer to the camera 14. What is desired, therefore, is to reduce the magnification of the lens 18 by applying an appropriate electronic zoom correction voltage 26 to the digital zoom circuitry (not shown) of the camera 14 so that the size of the object's image remains constant throughout the entire exposure period.

To determine the appropriate correction voltage 26, the lens 18 is calibrated using known triangulation principles that correct for the fact that the camera lens 18 may not be linear. In other words, suppose an object of known height, here six feet, is 200 feet from the camera lens 18 and the object height appears in the camera's viewfinder as 0.5 inches, meaning 0.5 inches corresponds to a six foot tall object located at 200 feet from the lens 18. Then, suppose the object is relocated 100 feet from the lens 18, if the lens 18 were linear, the object would appear 1 inch tall in the camera viewfinder. However, this is often not the case.

Thus, it is possible to calibrate the camera 14 at a voltage ($V_1$) that corresponds to a focus adjustment which is required to bring an object of known height located a predetermined range from the camera lens 18 into proper magnification. For purposes of illustration only, the desired predetermined range of the camera 14 is selected here as 200 feet, meaning the camera 14 is able to detect objects at up to 200 feet from the camera lens 18. The camera 14 can also be calibrated to a voltage ($V_2$) that corresponds to a focus adjustment required to bring the same object, located a shorter distance from the camera lens 18, into proper magnification. So, as described above, if the camera 14 were moving in the direction of the object at 65 miles per hour and the shutter exposure time of the camera 14 were set to one second, the camera 14 would have traveled a distance of (65×5280)/3600=95.3 feet in one second. And knowing the distance that the camera 14 has traveled during exposure, the camera 14 can be calibrated to the voltage ($V_2$) that corresponds to a focus adjustment required to bring the object, now located at (200 ft−93.5 ft) from the camera lens 18, into proper magnification. In the present example, once voltage $V_1$ and $V_2$ have been determined, the overall voltage 26 required to correct for the optical flow due to the forward motion of the camera 14 is equal to a voltage change ($\Delta V$) which is determined by difference between the voltage ($V_1$) at 200 feet and the voltage ($V_2$) at (200 ft−95.3 ft). Thus, the correction voltage 26 for 65 mph at a range of 200 ft is equal to minus $\Delta V$. This correction voltage 26 is applied during the exposure period of the camera 14, here one second, and is then reset to the voltage $V_1$ once the period of exposure has expired.

It is important to note that since the correction voltage 26 is linear with respect to the lens 18 magnification, the algorithm of the present invention, is able to use any predetermined viewing range and exposure time of the camera system 14, as well as the speed of the vehicle to determine an appropriate correction in the magnification of the lens 18 based on how far the vehicle travels during the exposure period. Thus, the inputs to the DSP chip 22 are the vehicle speed, the desired predetermined range of the camera 14, and the desired predetermined exposure time of the camera 14. And the output of the DSP chip 22 is the digital zoom correction voltage 26 that has been computed based on the speed at which the camera 14 is moving.

Figure 3:
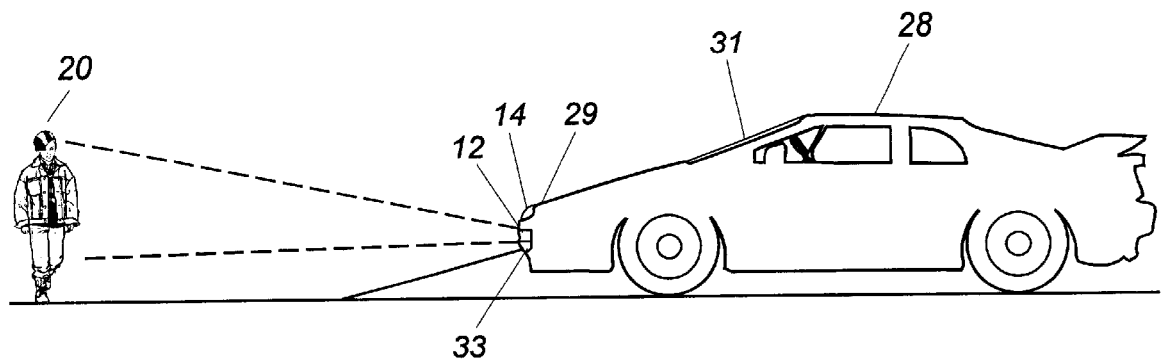
FIG. 3 is an isometric diagram of a system for providing recognition of an approaching object located in a distant scene in accordance with an embodiment of the present invention.

Referring to FIG. 3, the present invention is thus particularly useful as a night vision driving aid. Using a car 28 as an example, FIG. 3 illustrates the system 10 in accordance with the principles of the present invention. The camera 14, having enhanced infrared sensitivity and range in accordance with the principles of the present invention, is integrated into a front grill 29 of the car 28. A pair of infrared LED illuminators 12 may be installed into an existing housing of the car's visible headlamps 33 or integrated with the car's standard visible headlamps 33. A liquid crystal display (LCD) 31 may be included in the interior cabin of the car to display an image of a distant object 20 to the driver. And, based on the principles of the present invention, as the car 28 is traveling in the direction of the distant object 20, the infrared LED headlamps 12 illuminate a distant scene containing the object 20 and so that the camera 14 can capture the image of the object 20. The camera 14 captures the image of the object 20 by dynamically correcting the magnification of the object 20 during an extended exposure to compensate for the forward motion of the car 28. As a result of correcting the magnification of the object 20 by holding the object 20 stationary on the focal plane of the camera 14, the probability of detecting the object 20 is significantly increased.

As illustrated in the embodiments of the present invention, the present invention presents a low-cost alternative to other known night vision aid approaches by using low-cost commercially available components which may include commercially available digital imaging cameras, such as CCD or CMOS cameras. The present invention improves the infrared sensitivity and range of such cameras by a factor of approximately 60 by increasing their exposure time up to one second and correcting any image distortion that may occur during the exposure time as a result of optical flow. Obviously, many modifications and variations of the present invention are possible in light of the above teachings. Thus, it is to be understood that, within the scope of the appended claims, the invention may be practiced otherwise than as specifically described above.

What is claimed is:

1. A system for providing recognition of a distant object, comprising:

an illumination source for transmitting light radiation to the distant object;

an imaging device having a detector element including a plurality of pixel elements and a lens, the lens detecting the light radiation reflected from the distant object to generate an image of the object corresponding thereto; and a digital signal processor element electrically connected with the imaging device, the digital signal processor element dynamically calculating a desired optical magnification of the lens as a function of a distance between the imaging device and the distant object, generating a voltage corresponding to the desired optical magnification and applying the voltage to the imaging device to adjust a magnification of the lens wherein the magnification adjustment is applied to each pixel element within a field of view of the detector element so that the image of the distant object is held in a fixed dimension for a predetermined period of time sufficient to capture the reflected light radiation.

2. A system as recited in claim 1, wherein the illumination source is an infrared light emitting diode.

3. A system as recited in claim 1, wherein the illumination source is a high frequency modulated illumination source.

4. A system as recited in claim 1, wherein the imaging device is a photoelectric image detector device.

5. A system as recited in claim 4, wherein the photoelectric image detector device is a near infrared sensitive photoelectric image detector device.

6. A system as recited in claim 5, wherein the near infrared sensitive photoelectric image detector device is a charge coupled device (CCD) camera.

7. A system as recited in claim 5, wherein the near infrared sensitive photoelectric image detector device is a complementary metal-oxide-semiconductor (CMOS) camera.

8. A system as recited in claim 1, wherein the lens is a digital zoom lens.

9. A system as recited in claim 8, wherein the digital zoom lens is a programmable digital zoom lens.

10. A system as recited in claim 1, wherein the digital signal processor element is a digital signal processing (DSP) chip.

11. A system as recited in claim 1, wherein the digital signal processor element comprises an arithmetic logic circuit programmed to determine the desired optical magnification as a function of the distance between the imaging device and the object.

12. A system as recited in claim 1, wherein the detector element is a charge coupled device (CCD) chip.

13. A method for providing recognition of a distant object, comprising:

transmitting light radiation to the distant object;

detecting the light radiation reflected from the distant object at an imager device having a lens;

calculating a desired optical magnification of the lens as a function of a distance between the imager device and the distant object;

generating a voltage corresponding to the desired optical magnification of the lens; and applying the voltage to the imager device to adjust a magnification of the lens to the desired optical magnification so that an image of the object is held in a fixed dimension for a predetermined period of time.

14. The method as recited in claim 13, wherein transmitting light radiation to the distant object comprises transmitting infrared light to the distant object.

15. The method as recited in claim 13, wherein detecting the light radiation reflected from the distant object at the imager device comprises detecting the light radiation reflected from the distant object at a photoelectric image detector device.

16. The method as recited in claim 15, wherein detecting the light radiation reflected from the distant object at the photoelectric image detector device comprises detecting the light radiation reflected from the distant object at a near infrared sensitive photoelectric image detector device.

17. The method as recited in claim 16, wherein detecting the light radiation reflected from the distant object at the near infrared sensitive photoelectric image detector device comprises detecting the light radiation reflected from the distant object at a CCD camera.

18. The method as recited in claim 16, wherein detecting the light radiation reflected from the distant object at the near infrared sensitive photoelectric image detector device comprises detecting the light radiation reflected from the distant object at a CMOS camera.

19. The method as recited in claim 16, wherein detecting the light radiation reflected from the distant object at the imager device having the lens comprises detecting the light radiation reflected from the distant object at the imager device having a digital zoom lens.

20. The method as recited in claim 13, wherein calculating the desired optical magnification of the lens comprises:

calculating a distance between the imaging device and the distant object; and determining the desired optical magnification as a function of the distance between the imaging device and the distant object.

* * * * *